(12) United States Patent
Sanfelice et al.

(10) Patent No.: US 10,263,541 B2
(45) Date of Patent: Apr. 16, 2019

(54) ROBUST SINGLE-PHASE DC/AC INVERTER FOR HIGHLY VARYING DC VOLTAGES

(71) Applicant: The Regents of the University of California, Oakland, CA (US)

(72) Inventors: Ricardo G. Sanfelice, Santa Cruz, CA (US); Jun Chai, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/846,938

(22) Filed: Dec. 19, 2017

(65) Prior Publication Data

US 2018/0123479 A1 May 3, 2018

Related U.S. Application Data

(63) Continuation of application No. 14/879,630, filed on Oct. 9, 2015, now Pat. No. 9,876,442.

(60) Provisional application No. 62/062,385, filed on Oct. 10, 2014.

(51) Int. Cl.
*H02M 7/5387* (2007.01)

(52) U.S. Cl.
CPC .............................. *H02M 7/53871* (2013.01)

(58) Field of Classification Search
CPC .................. H02M 7/53871; H05K 999/99
USPC ......................................................... 363/97
See application file for complete search history.

(56) References Cited

U.S. PATENT DOCUMENTS

| | | | | |
|---|---|---|---|---|
| 3,890,537 A | * | 6/1975 | Park | H02M 1/4208 315/208 |
| 5,942,876 A | * | 8/1999 | Maekawa | H02M 7/53875 318/778 |
| 7,348,758 B2 | * | 3/2008 | Ho | H02M 7/53875 318/599 |
| 7,589,486 B2 | * | 9/2009 | Yamada | H02P 21/0003 318/400.02 |
| 7,750,595 B2 | * | 7/2010 | Yamada | H02P 23/0027 318/767 |
| 9,246,409 B2 | * | 1/2016 | Wu | H02M 7/53871 |

(Continued)

OTHER PUBLICATIONS

Received STIC search report from EIC 2800 searcher Mesfin Getaneh on Apr. 9, 2018 for claim 1.*

(Continued)

*Primary Examiner* — Timothy J. Dole
*Assistant Examiner* — Htet Z Kyaw
(74) *Attorney, Agent, or Firm* — Lumen Patent Firm

(57) ABSTRACT

A single-phase DC/AC inverter has a single-phase inverter bridge with binary switches connected to an RLC low-pass filter. Digital control logic in a control circuit (or in a microcontroller) determines and controls a logic state q determining the position of the switches in the inverter bridge from sensed $i_L$, $v_C$ values from the RLC filter. The control logic selects one of multiple possible logic states q based on whether the sensed $i_L$, $v_C$ values belongs one of multiple boundary regions of a tracking band in an $i_L$, $v_C$ state space.

6 Claims, 3 Drawing Sheets

(56) References Cited

U.S. PATENT DOCUMENTS

| | | | | |
|---|---|---|---|---|
| 9,876,442 B2* | 1/2018 | Sanfelice | .......... | H02M 7/53871 |
| 2005/0185690 A1* | 8/2005 | Rule | ....................... | H01S 3/036 |
| | | | | 372/55 |
| 2007/0114985 A1* | 5/2007 | Latham | ................ | H02M 3/157 |
| | | | | 323/283 |
| 2009/0027025 A1* | 1/2009 | Latham | ................ | H02M 3/157 |
| | | | | 323/283 |
| 2009/0280757 A1* | 11/2009 | Zhu | ...................... | H01Q 1/2241 |
| | | | | 455/114.1 |
| 2010/0156186 A1* | 6/2010 | Kim | .................... | H01M 16/003 |
| | | | | 307/72 |
| 2011/0222326 A1* | 9/2011 | Gray | ................ | H02M 7/53875 |
| | | | | 363/132 |
| 2012/0232810 A1* | 9/2012 | Kaipio | ................... | G01N 27/06 |
| | | | | 702/45 |
| 2015/0062988 A1* | 3/2015 | Amirahmadi | ..... | H02M 7/53873 |
| | | | | 363/97 |
| 2015/0303829 A1* | 10/2015 | Ilic | ...................... | H02M 7/5387 |
| | | | | 363/71 |

OTHER PUBLICATIONS

Received STIC search report from EIC 2800 searcher Mesfin Getaneh on Apr. 9, 2018 for claim 2.*

* cited by examiner

*Fig. 1A*
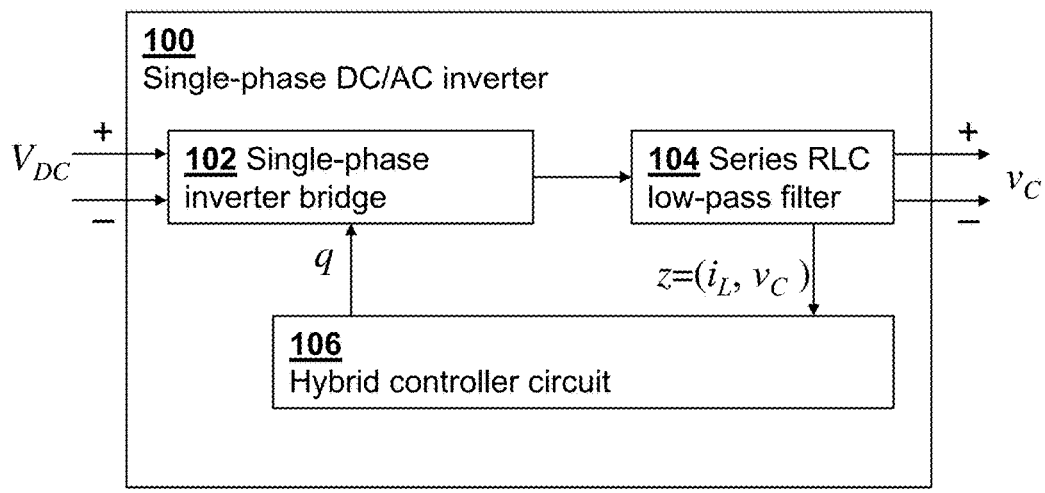
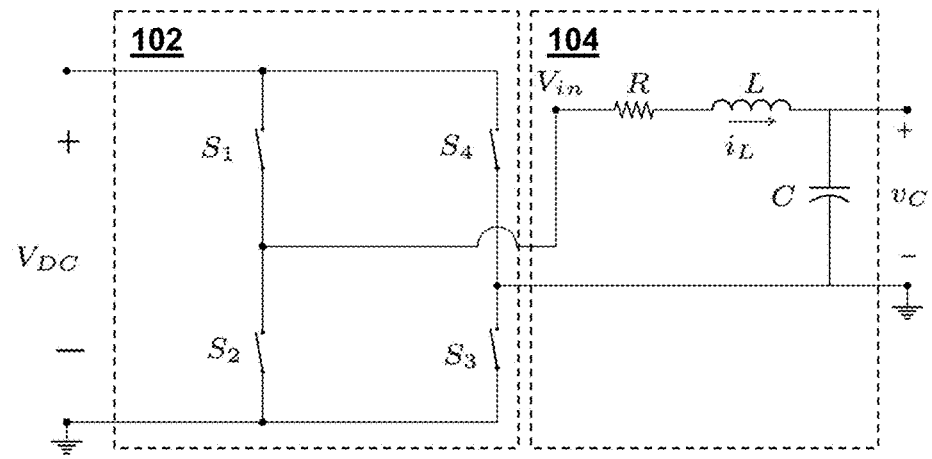
*Fig. 1B*

ROBUST SINGLE-PHASE DC/AC INVERTER FOR HIGHLY VARYING DC VOLTAGES

CROSS-REFERENCE TO RELATED APPLICATIONS

This application is a continuation of U.S. patent application Ser. No. 14/879,630 filed Oct. 9, 2015, which claims priority from U.S. Provisional Patent Application 62/062,385 filed Oct. 10, 2014, which is incorporated herein by reference.

STATEMENT OF GOVERNMENT SPONSORED SUPPORT

This invention was made with Government support under grant (or contract) no. FA9550-12-1-0366 awarded by the Air Force Office of Scientific Research, and under grant (or contract) no. ECS-1150306 awarded by the National Science Foundation. The Government has certain rights in the invention.

FIELD OF THE INVENTION

The invention relates generally to techniques for electrical power inversion. More specifically, it relates to methods and devices for DC/AC conversion.

BACKGROUND OF THE INVENTION

DC/AC inverters convert input DC power to output AC power. Typically, DC/AC inverters are controlled using pulse width modulation (PWM) techniques. Although these inverters have many uses, one example where DC/AC inverters play an important role is in photovoltaic energy systems. DC input power from photovoltaic arrays is converted to AC output power which is typically connected to a power grid and/or used to provide AC power to a residential or commercial building. One of the shortcomings of inverters using PWM-based controllers is that the output voltage magnitude is not robust to changes of the input DC voltage. However, the DC input can rapidly change in dependence upon weather related changes in solar irradiance of the photovoltaic array, causing unpredictable variations in the characteristics of the output AC power from the inverter. Significant problems can result from connecting such a variable AC power source to a power grid. To address this problem, a DC voltage regulator is often used at the inverter input, adding complexity and expense to the inverter. Another disadvantage of PWM-based controllers is that they result in relatively high harmonic distortions in the output. Circuitry to correct for this problem adds yet more complexity and expense to the inverter. These problems are not limited to DC/AC inverters for photovoltaic energy systems. The same problems apply to any application where stable AC power is needed but the DC power is unpredictable and highly varying. It would thus be an improvement in the art to provide a simple and robust power inverter that can provide stable AC output power even with unstable and/or highly varying input DC power.

SUMMARY OF THE INVENTION

In one aspect, the invention provides a single phase DC/AC inverter with a unique hybrid control circuit. Given an input DC voltage signal, the inverter produces an AC output signal that approximates a given sinusoidal AC reference signal. The control circuit uses measurements of the output voltage and current to control the four switches defining the single inverter.

The inverter solves the problem of robustly converting highly varying DC power into desired AC power. Advantageously, the precision with which the AC output signal approximates a desired reference signal can be adjusted via a tunable parameter in the control circuit, conversion is guaranteed under varying input voltages, and the harmonic distortion is almost entirely eliminated at low frequencies. The inverter can be implemented using existing hardware components. Specifically, the inverter may be implemented using a computer-controlled single-phase inverter bridge, a low pass filter, and voltage and current sensors. Consequently, it can be realized inexpensively.

According to embodiments of the invention, a single-phase DC/AC inverter includes a single-phase inverter bridge having two DC input terminals, wherein a switching state of the single-phase inverter bridge is controlled by a logic state control signal (q); a series RLC low-pass filter connected to the single-phase inverter bridge and having two AC output terminals; and a hybrid controller circuit connected to the RLC low-pass filter and to the single-phase inverter bridge, where the hybrid controller circuit outputs the logic state control signal (q) to the single-phase inverter bridge in response to a current-and-voltage signal (z) received from the series RLC low-pass filter. The hybrid controller circuit selects the logic state control signal (q) to ensure forward invariance of the current-and-voltage signal (z) within a tracking band when the current-and-voltage signal (z) is in the tracking band, and selects the logic state control signal (q) to ensure global convergence of the current-and-voltage signal (z) to the tracking band when the current-and-voltage signal (z) is not in the tracking band, where the tracking band is a region in current-voltage state space. The hybrid controller circuit comprises a forward invariance controller that outputs, in response to the current-and-voltage signal (z), a forward invariance control signal to steer the current-and-voltage signal (z) within the tracking band; a global convergence controller that outputs, in response to the current-and-voltage signal (z), a global convergence control signal to steer the current-and-voltage signal (z) toward the tracking band in current-voltage state space; and a supervisor controller that selects the logic state control signal (q) to be output from the hybrid controller circuit by selecting a forward invariance control signal generated by the forward invariance controller when the current-and-voltage signal (z) is in the tracking band, and selecting a global convergence control signal generated by the global convergence controller when the current-and-voltage signal (z) is not in the tracking band.

BRIEF DESCRIPTION OF THE DRAWINGS

FIG. 1A is a schematic block diagram of a single-phase DC/AC inverter, according to an embodiment of the invention.

FIG. 1B is a schematic circuit diagram of a single-phase inverter bridge and RLC low-pass filter components of a DC/AC inverter, according to an embodiment of the invention.

DETAILED DESCRIPTION

Figure 1C:
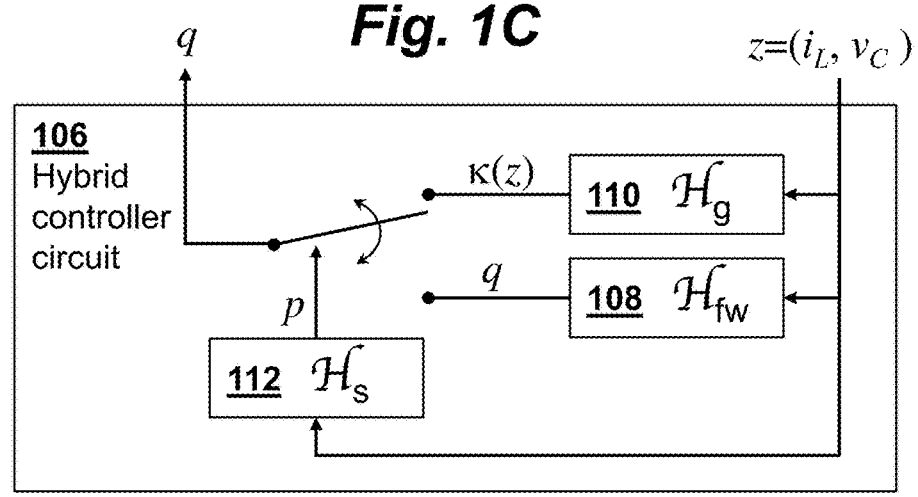
FIG. 1C is a schematic block diagram illustrating the structure of a hybrid controller circuit according to an embodiment of the invention.

A schematic block diagram of an embodiment of the invention is shown in FIGS. 1A and 1B. The single-phase DC/AC inverter 100 includes a single-phase inverter bridge 102 having a set of four signal-controllable switches $S_1$, $S_2$, $S_3$, $S_4$ connected to two DC terminals having an input DC voltage $V_{DC}$ across them. The input voltage $V_{DC}$ may be variable and unpredictable. Connected to the single-phase inverter bridge 102 is a series RLC low-pass filter 104 with two AC output terminals providing an output AC voltage. The RLC low-pass filter 104 has a resistor R, an inductor L, and a capacitor C, arranged in series as shown in FIG. 1B. The current through the inductor L is denoted $i_L$ and the voltage across the capacitor is denoted $v_C$ which is also the AC output voltage from the filter 104. During operation, the inverter 100 has a state characterized by a real-time pair of continuous values $(i_L, v_C)$ which may be represented as a point $z=(i_L, v_C)$ in a two-dimensional state space. Because the values $(i_L, v_C)$ vary continuously, the state space of the filter 104 is continuous. The inverter bridge 102, on the other hand, has a discrete state space of discrete ON-OFF values for the four switches $S_1$, $S_2$, $S_3$, $S_4$. Thus, the inverter is a hybrid discrete/continuous system.

The inverter also includes a hybrid controller circuit 106, as shown in FIG. 1A. The controller circuit 106 measures the sensed RLC filter state $z=(i_L, v_C)$ received though input lines from the filter 104. In response to the state $z=(i_L, v_C)$, digital control logic in the control circuit 106 determines a value of the logic state q of the switches in inverter bridge 102. The logic state q preferably has three possible states for the four switches: i) q=1: $S_1,S_3$ ON and $S_2,S_4$ OFF, ii) q=−1: $S_1,S_3$ OFF and $S_2,S_4$ ON, and iii) q=0: $S_1,S_4$ OFF and $S_2,S_3$ ON. Depending on the state q of the switches, the DC voltage provided from the inverter bridge 102 to the RLC filter 104 will be either $V_{DC}$, $-V_{DC}$, or 0. Discrete changes in the state of the switches 102 thus introduces non-smooth dynamics to the continuous state of the RLC filter 104.

The generated logic state q is sent by output lines from the controller circuit 106 to the inverter bridge 102 where its four signal-controllable switches are set to the received logic state q. The controller appropriately changes the logic state of the switches so that the AC output $v_C$ approximates a sinusoidal reference signal of a desired frequency. This control technique ensures that the inverter AC output is robust to large DC input variations that are typical in renewable energy sources. More specifically, the control logic switches the logic state q by selecting one of the three possible logic states based on whether the sensed $(i_L, v_C)$ values map to one of six boundary regions of a tracking band in an $(i_L, v_C)$ state space.

Controller 106 generates a discrete control based on a continuous input. It is an example of a hybrid controller. The control logic is configured using adjustable system parameters preferably determined before powering up the inverter. The tunable parameters affecting precision and robustness of the system include the parameters of the low-pass filter (values of the resistor, capacitor, and inductor) and the parameters of the control circuit (the constants defining the switching conditions). More specifically, the precision to which the AC voltage output approximates the reference signal, i.e., the width of the tracking band, is tunable by a parameter in the controller. The control logic can ensure that an AC output signal that approximates the reference will be generated for any DC input signal larger than a predetermined threshold, which can be tuned by the parameters of the circuit and of the controller. In addition, conversion is guaranteed even under highly varying DC input voltages. The control logic also ensures that close to zero harmonic distortion is present in the AC output at low frequencies.

Figure 2:
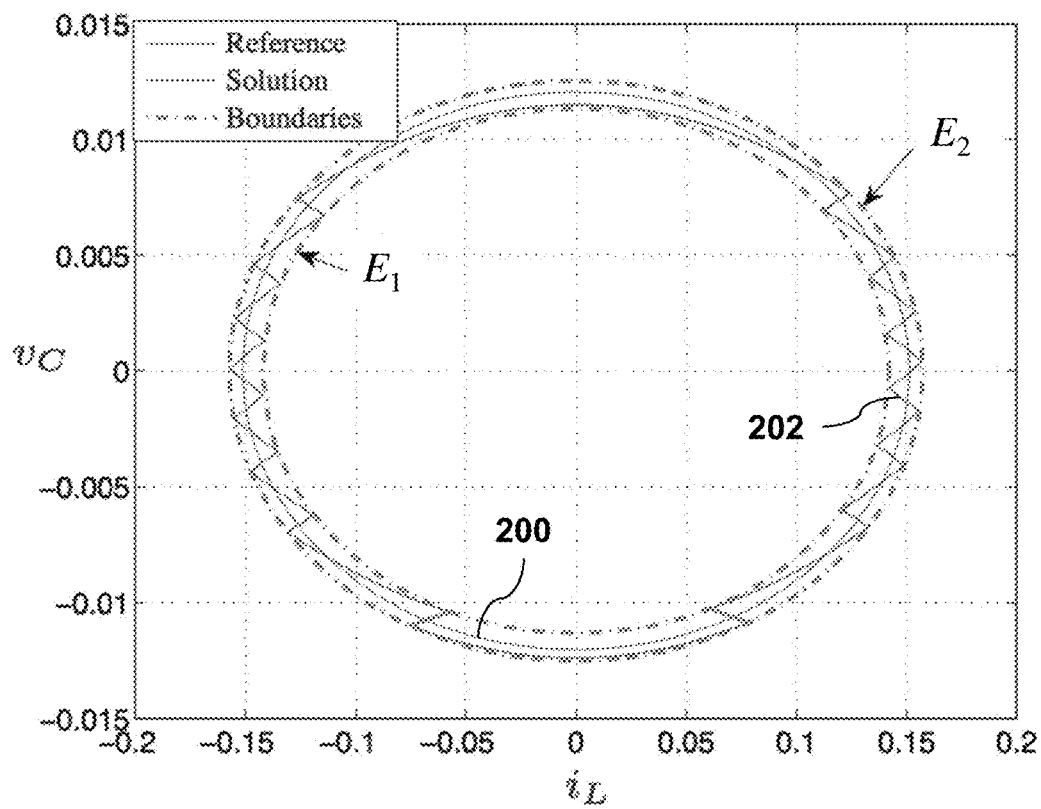
FIG. 2 is a phase portrait in the inductor current vs. voltage output plane for a DC/AC inverter, illustrating an elliptical reference trajectory and actual simulated solution trajectory contained within the tracking band boundaries, according to an embodiment of the invention.

The AC reference signal is the desired ideal AC output of the inverter, and it may be characterized by a closed elliptical path 200 in $(i_L, v_C)$ state space, as shown in FIG. 2. Specifically, the reference signal is the steady-state response of the RLC filter to sinusoidal input $A \sin(\omega t+\theta)$, where A, $\omega$ and $\theta$ are parameters specifying the magnitude, angular frequency, and initial phase, of the desired ideal output of the inverter. The ellipse of the trajectory of the reference signal has its major and minor axes defined in terms of the parameters R, L, C, and $\omega$. Specifically, the reference signal path may be defined as the set of points $z=(i_L, v_C)$ satisfying $V(z)=c$ for some constant c, i.e., $\{z: V(z)=c\}$, where $V(z)$ is defined by $V(z)=(i_L/a)^2+(v_C/b)^2$, with constants a and b defined by $1/a^2=R^2+(L\omega-1/C\omega)^2$ and $a/b=C\omega$.

The tracking band is a band in $(i_L, v_C)$ state space that contains the AC reference signal trajectory. The band may be defined, for example, as a neighborhood of the reference signal trajectory. For example, for two constants $c_1$ and $c_2$, such that $c_1<c<c_2$, the tracking band may be defined as the set of points $\{z: c_1 \leq V(z) \leq c_2\}$, i.e., the set of points in $(i_L, v_C)$ state space that are outside the boundary ellipse $E_1=\{z: V(z)=c_1\}$ but inside the boundary ellipse $E_2=\{z: V(z)=c_2\}$, as shown in FIG. 2. The width of the tracking band is represented by $|c_2-c_1|$ and is chosen according to the desired tracking precision, where a large width corresponds to low-precision tracking and a small width corresponds to a high-precision tracking. An actual inverter state trajectory 202 resulting from the hybrid control technique of the present invention remains in the tracking band for all time while following a periodic orbit. The parameters of the example illustrated in FIG. 2 are R=0.6Ω, L=0.1 H, C=0.04 F, $V_{DC}$=5 V, $c_1$=0.9, $c_2$=1.1, and c=1.

The controller may be theoretically characterized using hybrid system theory. A hybrid system, also known as a hybrid dynamical system, is defined in R. Goebel et al., "Hybrid Dynamical Systems" page ix, paragraph 2, ISBN 978-0-691-15389-6 as a system that exhibits characteristics of both continuous-time systems and discrete-time systems. Examples of hybrid systems include circuits that combine analog and digital components and mechanical devices controlled by digital computers. The hybrid controller of the present invention is designed to ensure that all states of the inverter within the tracking band remain within the tracking band and that states from outside the tracking back converge to the tracking band in finite time. Consequently, the inverter is ensured to exhibit global asymptotic stability of the tracking band, which, in turn, implies robustness to small perturbations and variation of the input voltage. The following control logic satisfies these conditions.

The general principle of the control logic is to appropriately change the discrete logic state q when the continuous state z encounters the inner or outer boundary of the tracking band. The new value for the logic state q depends on the particular portion of the boundary encountered as well as the current logic state of the switches. First, for a positive parameter $\varepsilon$ we define the sets $M_1 = \{z: V(z) = c_2, 0 \leq i_L \leq \varepsilon, v_C \leq 0\}$ and
$M_2 = \{z: V(z) = c_2, -\varepsilon \leq i_L \leq 0, v_C \geq 0\}$.

The parameter $\varepsilon$ should be chosen according to the width of the band and preferably to be less than 10% of the maximum output current (i.e., maximum horizontal displacement of ellipse $E_2$). The sets $M_1$ and $M_2$ correspond to two small arcs of the outer boundary ellipse $E_2$. Specifically, $M_1$ is an arc just to the right of the bottom of the ellipse (FIG. 3E), while $M_2$ is an arc just to the left of the top of the ellipse (FIG. 3F).

Using current values of z and q, the control logic selects a new value of q as follows:

a) If $z \in E_2 \setminus M_1$ and $i_L > 0$ and $q \in \{1, 0\}$, then set $q = -1$.
b) If $z \in E_2 \setminus M_2$ and $i_L \leq 0$ and $q \in \{-1, 0\}$, then set $q = 1$.
c) If $z \in E_1$ and $i_L > 0$ and $q \in \{-1, 0\}$, then set $q = 1$.
d) If $z \in E_1$ and $i_L \leq 0$ and $q \in \{1, 0\}$, then set $q = -1$.
e) If $z \in M_1$ and $q = 1$, then set $q = 0$.
f) If $z \in M_2$ and $q = -1$, then set $q = 0$.

Otherwise, q remains the same.

Figure 3A:
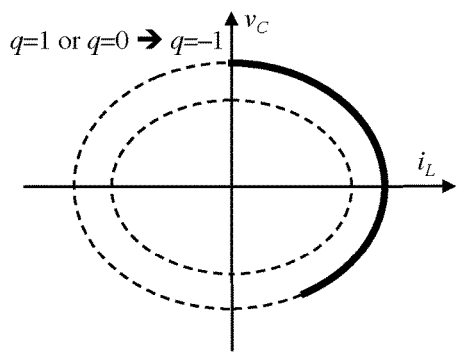
FIGS. 3A-F are phase portraits in the inductor current vs. voltage output of a DC/AC inverter, illustrating six boundary regions (bold) that correspond to changes in the logic state of inverter bridge switches, according to an embodiment of the invention.
Figure 3B:
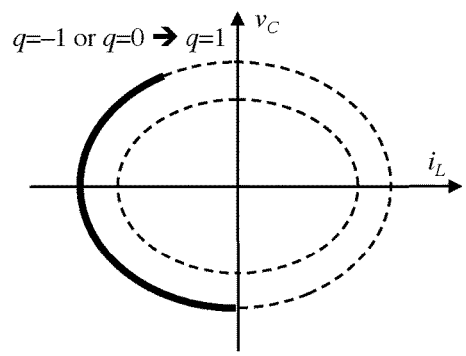
Figure 3C:
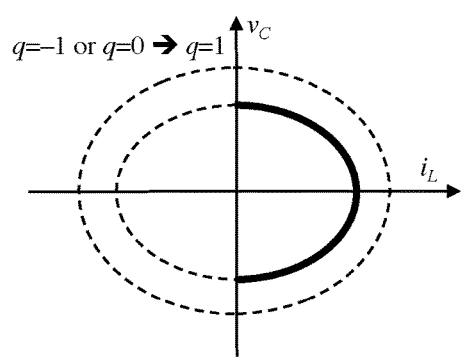
Figure 3D:
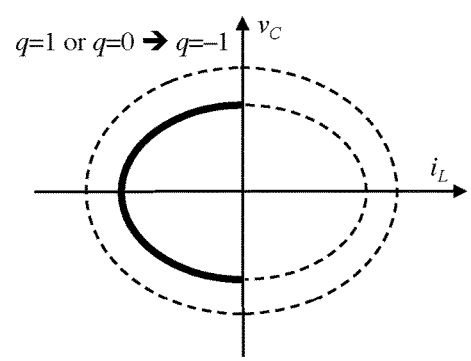
Figure 3E:
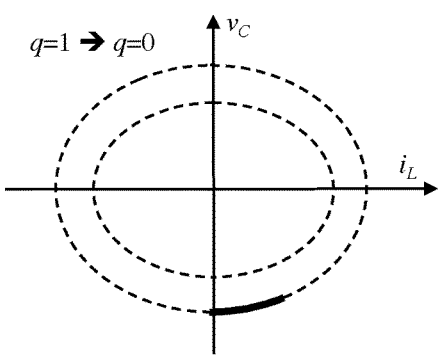
Figure 3F:
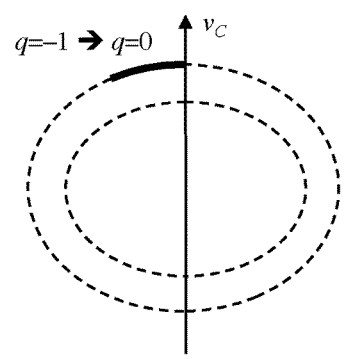

This control logic is schematically illustrated in FIGS. 3A-F. Steps (c) and (d) determine the behavior when the state z encounters the inner boundary of the tracking band. If the state z intersects the right half of the inner boundary of the band (FIG. 3C), then q is set to 1. If the state z intersects the left half of the inner boundary of the band (FIG. 3D), then q is set to −1. Steps (a), (b), (e), (f) determine the behavior when the state z encounters the outer boundary of the tracking band. If the state z intersects the right half of the outer boundary of the tracking band, then either q is set to 0 if it intersects the arc $M_1$ (FIG. 3E) or q is set to −1 otherwise (FIG. 3A). If the state z intersects the left half of the outer boundary of the tracking band, then either q is set to 0 if it intersects the arc $M_2$ (FIG. 3B) or q is set to −1 otherwise (FIG. 3F). Steps (e) and (f) of the control logic set the logic state to q=0 in order to prevent fast switching at the top and bottom extremes of the tracking band outer boundary, i.e., the points $\{z: V(z) = c_2, i_L = 0\}$. Detection of the intersection of the state z with boundary arcs $M_1$ and $M_2$ of the tracking band can be implemented using zero-cross detection techniques so as to allow for noise in the measurements.

The inventors have discovered and demonstrated that this control logic guarantees stable DC/AC conversion, even with variable input DC signals, provided $LC\omega^2 > 1$ and $V_{DC} > b \sqrt{c_2}$. The example inverter state trajectory 202, for example, illustrates how the control logic switches the discrete state q when the continuous state z encounters an inner or outer boundary of the tracking band in order to ensure that the trajectory of the state z remains in the tracking band.

FIG. 1C is a schematic block diagram illustrating the structure of the hybrid controller circuit 106 of FIG. 1A. The hybrid controller circuit 106 includes a forward invariance based controller $H_{fw}$ 108, a (static) global convergence controller $H_g$ 110, and a hybrid supervisor controller $H_s$ 112. Each of these controllers receives as input the current and voltage signal z. The hybrid supervisor controller $H_s$ controls a switch that determines whether the logic state control signal q output from the hybrid controller circuit 106 is the signal $\kappa(z)$ from the global convergence controller $H_g$ or the signal q from the forward invariance based controller $H_{fw}$. Specifically, $H_s$ uses the value of z to switch between controllers $H_{fw}$ and $H_g$ to guarantee global convergence and forward invariance of the tracking band. When z is in the tracking band, the forward invariance based controller $H_{fw}$ is selected. When z is not in the tracking band, the global convergence controller $H_g$ is selected.

Controller $H_{fw}$ was described in detail above in relation to FIG. 2 and FIGS. 3A-3F, where the signal from $H_{fw}$ ensures forward invariance when z is within the tracking band. Regarding controller $H_g$, it is used to guarantee global convergence when z is outside the tracking band. In one embodiment, $H_g$ generates signal $\kappa(z)$ given by $\kappa(z) = 0$ if $V(z) \geq c_2$ and $\kappa(z) = m$ if $V(z) \leq c_1$, where m is a constant parameter taking a value from $\{-1, 1\}$.

The static feedback law $\kappa$ is the output of $H_g$, which is used to control q, based on the current and voltage vector z. In this way, the choice $\kappa = 0$ steers the solutions to $E_2$ from outside of $\{z: V(z) < c_2\}$. The choice $\kappa = -1$ (or $\kappa = -1$ depending on the value of m) steers the solutions to $E_1$ from inside $\{z: c_1 < V(z)\}$. This ensures convergence to the tracking band in finite time.

An inverter according to an embodiment of the present invention may be physically realized in various ways. For example, the inverter may be implemented as a programmable microcontroller equipped with analog to digital conversion (ADC) and PWM hardware, and either field effect (FET) or insulated gate (IGBT) transistors with corresponding gate drive circuitry forming the H bridge. In addition, the output stage of inverter is preferably based on the LC low-pass filter in an 'L' or 'T' configuration, with higher order filters providing faster roll-off at the expense of complexity and cost. The control logic can be implemented in place of conventional PWM control logic without modification to the existing hardware, e.g., by appropriately modifying the programmable microcontroller code.

The invention claimed is:

1. A single-phase DC/AC inverter using hybrid control comprising:
   a single-phase inverter bridge having two DC input terminals, wherein a switching state of the single-phase inverter bridge is controlled by a logic state control signal (q);
   a series RLC low-pass filter connected to the single-phase inverter bridge and having two AC output terminals; and
   a hybrid controller circuit connected to the RLC low-pass filter and to the single-phase inverter bridge, where the hybrid controller circuit outputs the logic state control signal (q) to the single-phase inverter bridge in response to a current-and-voltage signal (z) received from the series RLC low-pass filter,
   wherein the hybrid controller circuit selects the logic state control signal (q) to ensure forward invariance of the current-and-voltage signal (z) within a tracking band when the current-and-voltage signal (z) is in the tracking band, and selects the logic state control signal (q) to ensure global convergence of the current-and-voltage signal (z) to the tracking band when the current-and-voltage signal (z) is not in the tracking band, where the tracking band is a region in current-voltage state space.

2. The single-phase DC/AC inverter of claim 1 wherein the hybrid controller circuit comprises:
   a forward invariance controller that outputs, in response to the current-and-voltage signal (z), a forward invariance control signal to steer the current-and-voltage signal (z) within the tracking band when the current-and-voltage signal (z) is in the tracking band.

3. The single-phase DC/AC inverter of claim 1 wherein the hybrid controller circuit comprises:
   a global convergence controller that outputs, in response to the current-and-voltage signal (z), a global convergence control signal to steer the current-and-voltage signal (z) toward the tracking band in current-voltage state space when the current-and-voltage signal (z) is not in the tracking band.

4. The single-phase DC/AC inverter of claim 1 wherein the hybrid controller circuit comprises:
a forward invariance controller;
a global convergence controller; and
a supervisor controller that selects the logic state control signal (q) to be output from the hybrid controller circuit by selecting a forward invariance control signal generated by the forward invariance controller when the current-and-voltage signal (z) is in the tracking band, and selecting a global convergence control signal generated by the global convergence controller when the current-and-voltage signal (z) is not in the tracking band.

5. The single-phase DC/AC inverter of claim 4 wherein the forward invariance controller outputs, in response to the current-and-voltage signal (z), a forward invariance control signal to steer the current-and-voltage signal (z) within the tracking band when the current-and-voltage signal (z) is in the tracking band.

6. The single-phase DC/AC inverter of claim 4 wherein the global convergence controller outputs, in response to the current-and-voltage signal (z), a global convergence control signal to steer the current-and-voltage signal (z) toward the tracking band in current-voltage state space when the current-and-voltage signal (z) is not in the tracking band.

\* \* \* \* \*